(12) United States Patent
Fukuda

(10) Patent No.: US 11,343,400 B2
(45) Date of Patent: May 24, 2022

(54) SEPARATING MECHANICAL ELEMENTS IN AN IMAGE FORMING APPARATUS AFTER A PREDETERMINED PERIOD OF TIME

(71) Applicant: CANON KABUSHIKI KAISHA, Tokyo (JP)

(72) Inventor: Takeshi Fukuda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 16/798,987

(22) Filed: Feb. 24, 2020

(65) Prior Publication Data

US 2020/0195806 A1 Jun. 18, 2020

Related U.S. Application Data

(63) Continuation of application No. PCT/JP2018/032277, filed on Aug. 24, 2018.

(30) Foreign Application Priority Data

Aug. 25, 2017 (JP) .............................. JP2017-162101

(51) Int. Cl.
*H04N 1/00* (2006.01)
*G03G 15/00* (2006.01)
*G03G 15/20* (2006.01)

(52) U.S. Cl.
CPC ....... *H04N 1/00896* (2013.01); *G03G 15/205* (2013.01); *H04N 1/00676* (2013.01); *H04N 1/00976* (2013.01)

(58) Field of Classification Search
None
See application file for complete search history.

(56) References Cited

U.S. PATENT DOCUMENTS

| 5,111,249 A | 5/1992 | Owada |
| 8,781,364 B2 | 7/2014 | Fukuda et al. |

(Continued)

FOREIGN PATENT DOCUMENTS

| JP | H03-123378 A | 5/1991 |
| JP | 2004-037888 A | 2/2004 |

(Continued)

OTHER PUBLICATIONS

International Search Report, dated Nov. 13, 2018, in International Application No. PCT/JP2018/032277.

(Continued)

*Primary Examiner* — Eric A. Rust
(74) *Attorney, Agent, or Firm* — Venable LLP

(57) ABSTRACT

An apparatus includes an image forming portion 10 for forming an image on a sheet; a first rotatable member 100; a second rotatable member 101 cooperative with the first rotatable member to form a nip for fixing the image formed by the image forming portion, on the sheet; a pressing mechanism 112, 113 for pressing the first rotatable member toward the second rotatable member; a moving mechanism 120 for moving the pressing mechanism between a first position in which the nip is formed by the first rotatable member and the second rotatable member, and a second position in which the first rotatable member and the second rotatable member are spaced from each other; and a controller 800 for controlling an operation of the moving mechanism, wherein the image forming apparatus is capable of executing an operation in a control mode in which a pressure releasing operation is executed such that the pressing mechanism is shifted from the first position to the second position after elapse of a predetermined time after completion of execution of the image formation job. The apparatus includes a manual operating portion 831 in which selection (Continued)

and setting can be executed as to whether to execute the operation in the control mode.

2 Claims, 13 Drawing Sheets

(56) References Cited

U.S. PATENT DOCUMENTS

| | | | |
|---|---|---|---|
| 9,310,724 | B2 | 4/2016 | Fukuda et al. |
| 9,342,045 | B2 | 5/2016 | Fukuda |
| 2005/0074263 | A1* | 4/2005 | Tanaka .............. G03G 15/2057 399/333 |
| 2006/0018678 | A1* | 1/2006 | Sekiguchi .......... G03G 15/5004 399/70 |
| 2008/0199197 | A1 | 8/2008 | Suzuki et al. .................. 399/67 |
| 2009/0060558 | A1 | 3/2009 | Uehara |
| 2012/0093531 | A1 | 4/2012 | Yuasa et al. |
| 2012/0176643 | A1* | 7/2012 | Kodimer ............ H04N 1/00411 358/1.15 |
| 2016/0320731 | A1 | 11/2016 | Kitagawa |

FOREIGN PATENT DOCUMENTS

| | | |
|---|---|---|
| JP | 2008-203569 A | 9/2008 |
| JP | 2008-233856 A | 10/2008 |
| JP | 2009-058664 A | 3/2009 |
| JP | 2010-190982 A | 9/2010 |
| JP | 2012-088441 A | 5/2012 |
| JP | 2015-200726 A | 11/2015 |

OTHER PUBLICATIONS

Office Action dated Jul. 27, 2021 in counterpart Japanese Application No. 2017-162101, together with English translation thereof.

* cited by examiner

SEPARATING MECHANICAL ELEMENTS IN AN IMAGE FORMING APPARATUS AFTER A PREDETERMINED PERIOD OF TIME

CROSS-REFERENCE TO RELATED APPLICATIONS

This application is a continuation of International Patent Application No. PCT/JP2018/032277 filed Aug. 24, 2018, which claims the benefit of Japanese Patent Application No. 2017-162101 filed Aug. 25, 2017. The foregoing applications are incorporated herein be reference in their entireties.

TECHNICAL FIELD

The present invention relates to an image forming apparatus capable of forming an image on a recording material such as a copying machine, a printer, or a facsimile using an electrophotographic process.

BACKGROUND OF THE INVENTION

An image forming apparatus using a transfer type electrophotographic method develops a latent image formed on a photosensitive drum as an image carrier with a toner (developer), and transfers the toner image (visualized image) to a recording material (sheet: hereinafter referred to as paper or sheet) using electrostatic force and pressure. Then, the transferred toner image is fixed by heat and pressure by a fixing device as an image heating device, so that an image is recorded and formed on a sheet material.

As a fixing device, a roller fixing method is conventionally employed, in which the elastic pressure roller is pressed and pressed by a pressure lever with a pressure spring stretched over the elastic fixing roller having a heater inside to form a fixing nip portion, and the sheet carrying the toner image is nipped and passed through the nip portion.

In order to suppress the plastic deformation of the elastic layer of each roller by maintaining the pressure contact state between the fixing roller and the pressing roller, a pressure method having a pressure release mechanism is used, in which the pressing lever is operated to retract the pressing roller from the fixing roller to release the pressure.

Further, in order to reduce the number of operations of the pressure release operation mechanism for the purpose of reducing the operation sound meeting the recent noise reduction desire and extending the life of the pressure release mechanism, there has been proposed a device which releases the pressure by a timer. In recent years, in the image forming apparatus, the operation thereof is shifted to a low power mode when the image forming apparatus is not forming an image, for the purpose of saving energy n consideration of the environment protection. In a transition to the low power mode, the pressure release operation of the fixing device is also performed.

JP 2009-58664 A proposes the following image forming apparatus. That is, the image forming apparatus for forming an image on a sheet comprises a mechanism for contacting and separating two elements relative to each other, and a time measuring means for measuring an elapsed time, wherein when a set time period is exceeded during a normal power supply mode operation, a control means starts the power saving mode. If a predetermined time is elapsed during the power saving mode from the end of the image forming operation, the power saving mode is stopped, and the two elements are separated from each other, and the control is performed so as to return to the power saving mode.

Problem to be Solved by the Invention

As described in Japanese Patent Application Laid-Open No. 2009-58664, when the resting of the device in the low power mode and the pressure release operation with a time difference provided by a timer from the operation of the main body are simultaneously activated, the apparatus is suddenly started from the resting state, and the pressure is released. For this reason, the operation sound may be noisier than the normal operation sound, and may impart discomfort to the user (operator). Further, if the pressure release mechanism is operated simultaneously with the transition to the low power mode in order to avoid this, the number of operations of the pressure release mechanism increases, with the result that the service life may be shortened due to the deterioration of the mechanism.

The present invention has been proposed in consideration of the above prior art. An object of the present invention is to provide an image forming apparatus that improves convenience, by meeting the needs of the user who wants to prioritize the reduction of the number of unnecessary pressure releasing operations in the fixing device and the user who wants to put priority to suppressing the operation sound of the sudden operation in the fixing device.

Means for Solving the Problem

According to an aspect of the present invention, there is provided an image forming apparatus for forming an image, said apparatus comprising an image forming portion for forming an image on a sheet; a first rotatable member; a second rotatable member cooperative with said first rotatable member to form a nip for fixing the image formed by said image forming portion, on the sheet; a pressing mechanism for pressing said first rotatable member toward said second rotatable member; a moving mechanism for moving said pressing mechanism between a first position in which said nip is formed by said first rotatable member and said second rotatable member, and a second position in which said first rotatable member and said second rotatable member are spaced from each other; and a controller for controlling an operation of said moving mechanism, wherein said image forming apparatus is capable of executing an operation in a control mode in which a pressure releasing operation is executed such that said pressing mechanism is shifted from the first position to the second position after elapse of a predetermined time after completion of execution of the image formation job, and wherein said apparatus further comprising a manual operating portion in which selection and setting can be executed as to whether to execute the operation in the control mode.

DESCRIPTION OF THE EMBODIMENTS

Next, specific examples (examples) of the embodiments of the present invention will be described in conjunction with the accompanying drawings, but the present invention is not limited to the following examples. The embodiment will be described as an image forming apparatus including a fixing device having a pressing mechanism and a pressure releasing mechanism according to the present embodiment.

Embodiment 1

[Image Forming Apparatus]

Figure 1:
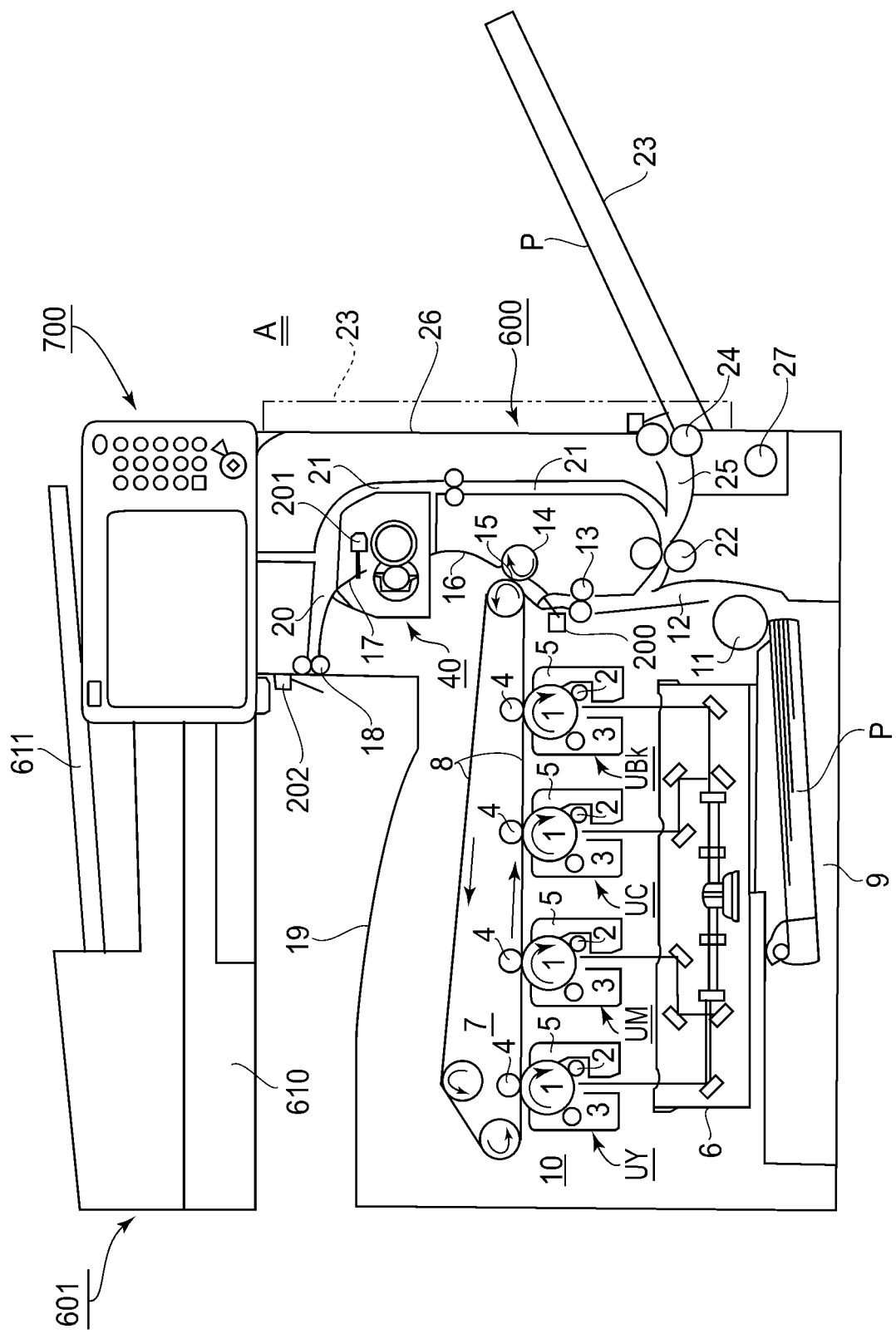
FIG. 1 is a schematic view illustrating a configuration of an image forming apparatus according to an embodiment.

FIG. 1 is a schematic view illustrating a structure of an image forming apparatus A according to this embodiment. The image forming apparatus A is a tandem type digital color copying machine (hereinafter simply referred to as a copying machine) using a transfer type electrophotographic system. FIG. 1 shows a schematic structure in a cross section taken along a feeding direction of a recording material (sheet) P. The recording material (hereinafter, referred to as sheet or paper) P is a material on which a toner image is formed. Specific examples of the sheet P include plain paper, a resin sheet which is a substitute for plain paper sheet, cardboard, and a sheet used with an overhead projector.

In the following, a main structure of the copying machine A will be described, referring to FIGS. 1-4. The copying machine A includes an engine portion (apparatus main assembly) 600 which forms the toner image on the sheet P, and an image reading portion 601 which is provided there above to read an image on an original document. In addition, on a front side of the copying machine A, an operating portion 700 for operating the copying machine is provided substantially in a middle between the engine portion 600 and the image reading portion 601. Moreover, a controlling portion 800 (FIG. 3) is provided on a back side of the engine portion 600 and controls the operation of the engine portion 600 and the image reading portion 601.

Figure 2:
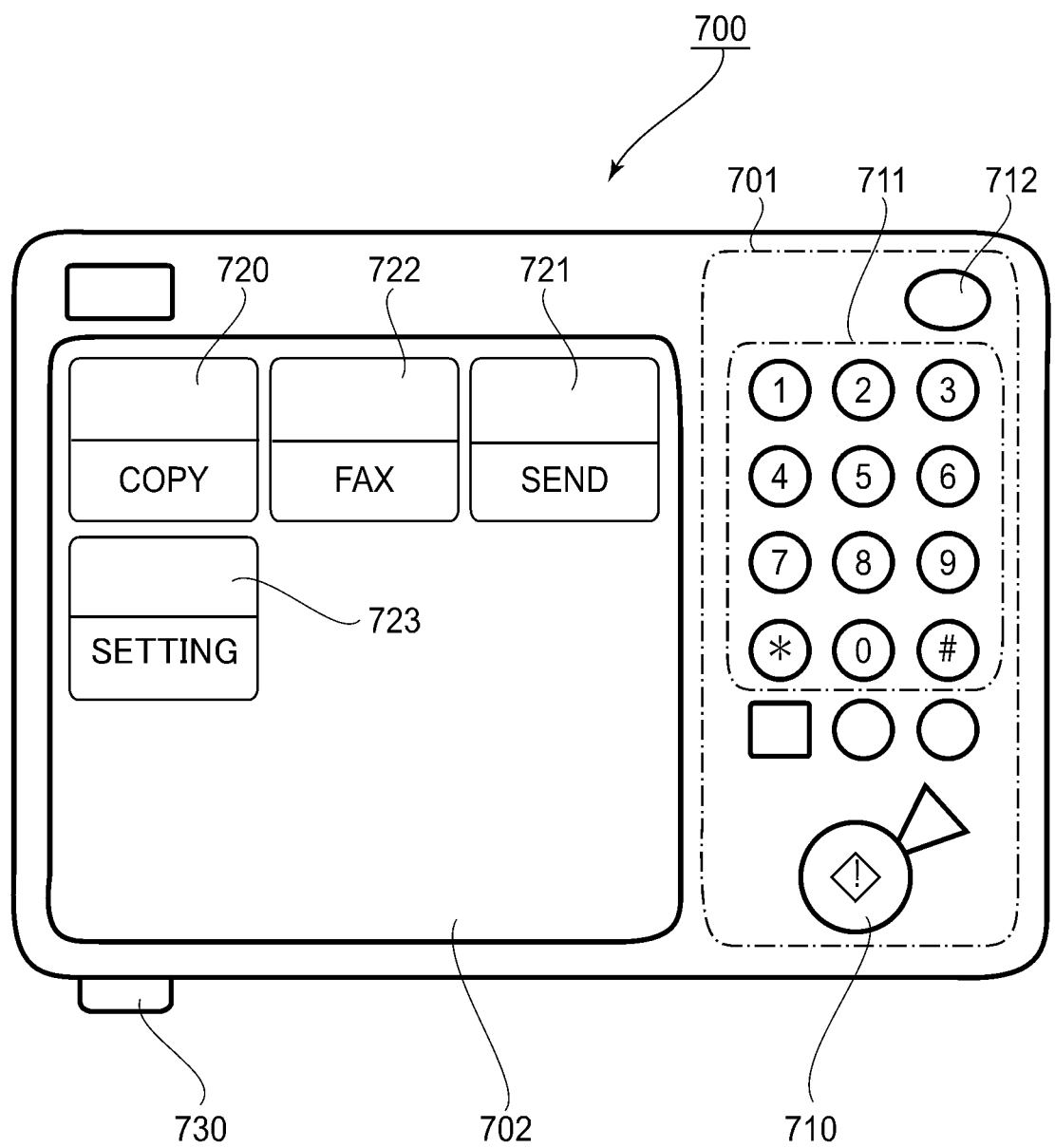
FIG. 2 is an enlarged schematic view of an operating portion.

FIG. 1 is a of the copying machine A as viewed from the front side, and illustrates an internal structure of the engine portion 600. FIG. 2 is an enlarged schematic of the operating portion 700. The operating portion 700 is provided with operation buttons 701 for operating the copying machine A and a touch panel 702 capable of displaying information and operating the machine.

The operation buttons 701 include a copy start button (document reading start button) 710, numeric keypads 711, a low power mode button 712, and so on. Here, the copy start button 710 causes the image reading portion 601 to read the image of the document, and starts a copy operation (copy operation) in which the image read by the image reading portion 601 is formed on the sheet P by the image forming unit 10. Button. The low power mode button 712 is a button for instructing shift from a standby mode M2 to a low power mode M3 and return from the low power mode M3 to a standby mode M2. The details of the standby mode M2 and the low power mode M3 will be described hereinafter.

On the touch panel 702, buttons which can be operated on a screen (document copy setting screen) are displayed. For example, a copy button 720 for setting the copy, a scan button 721 for transferring a read image, a facsimile button 722 for performing an operation for facsimile transmission, and a setting button 723 for performing a paper setting and an operation setting are displayed. Each button can be pressed by the operator, and a function corresponding to the pressed button is carried out. That is, each button is for operating each function when pressed by the operator.

That is, the copying machine A has an operating portion 700 capable of inputting a document reading function, a copy function for forming the read image of the document on a sheet, and a document reading instruction.

Figure 3:
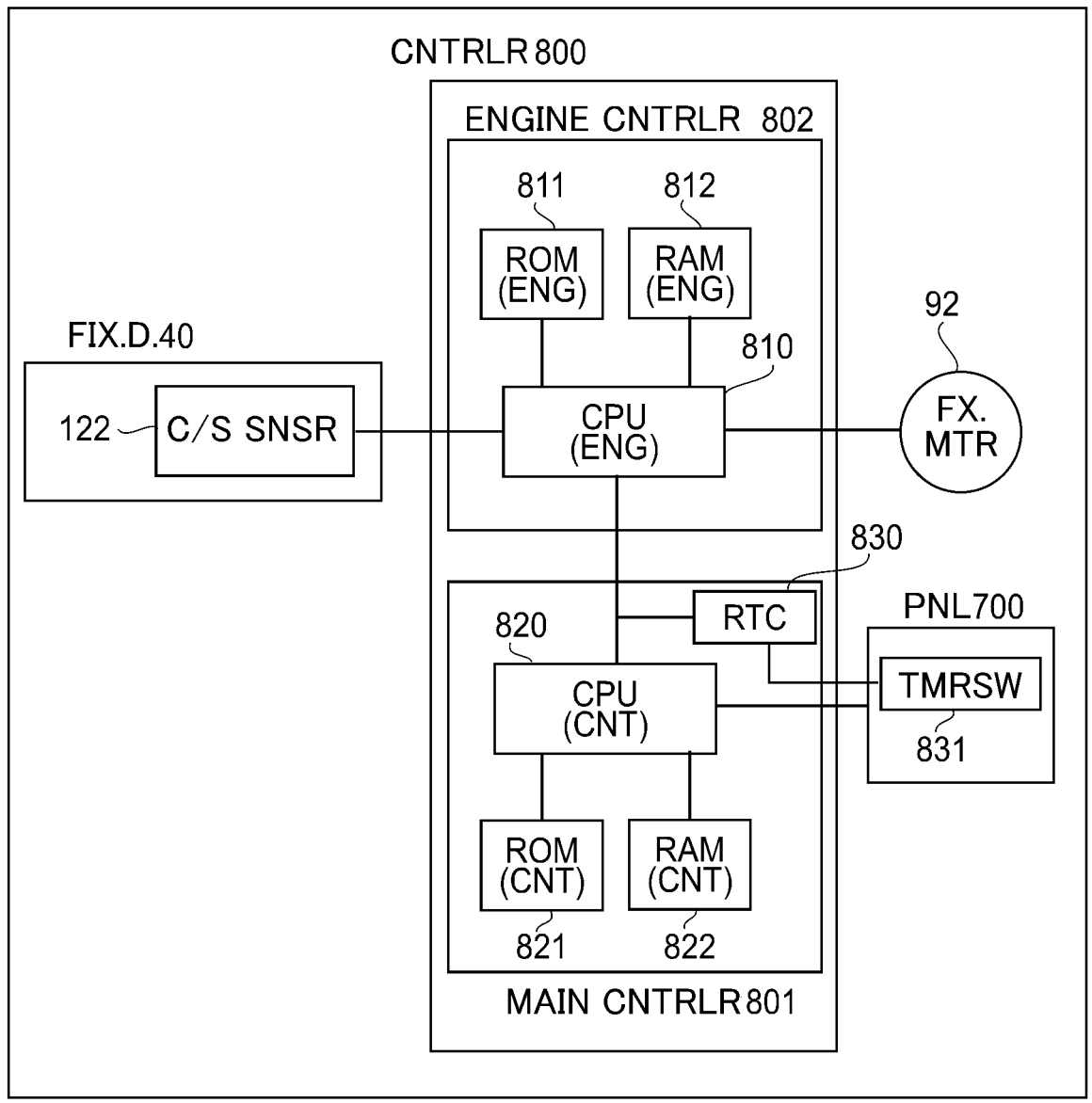
FIG. 3 is a block diagram of a control portion.
Figure 4:
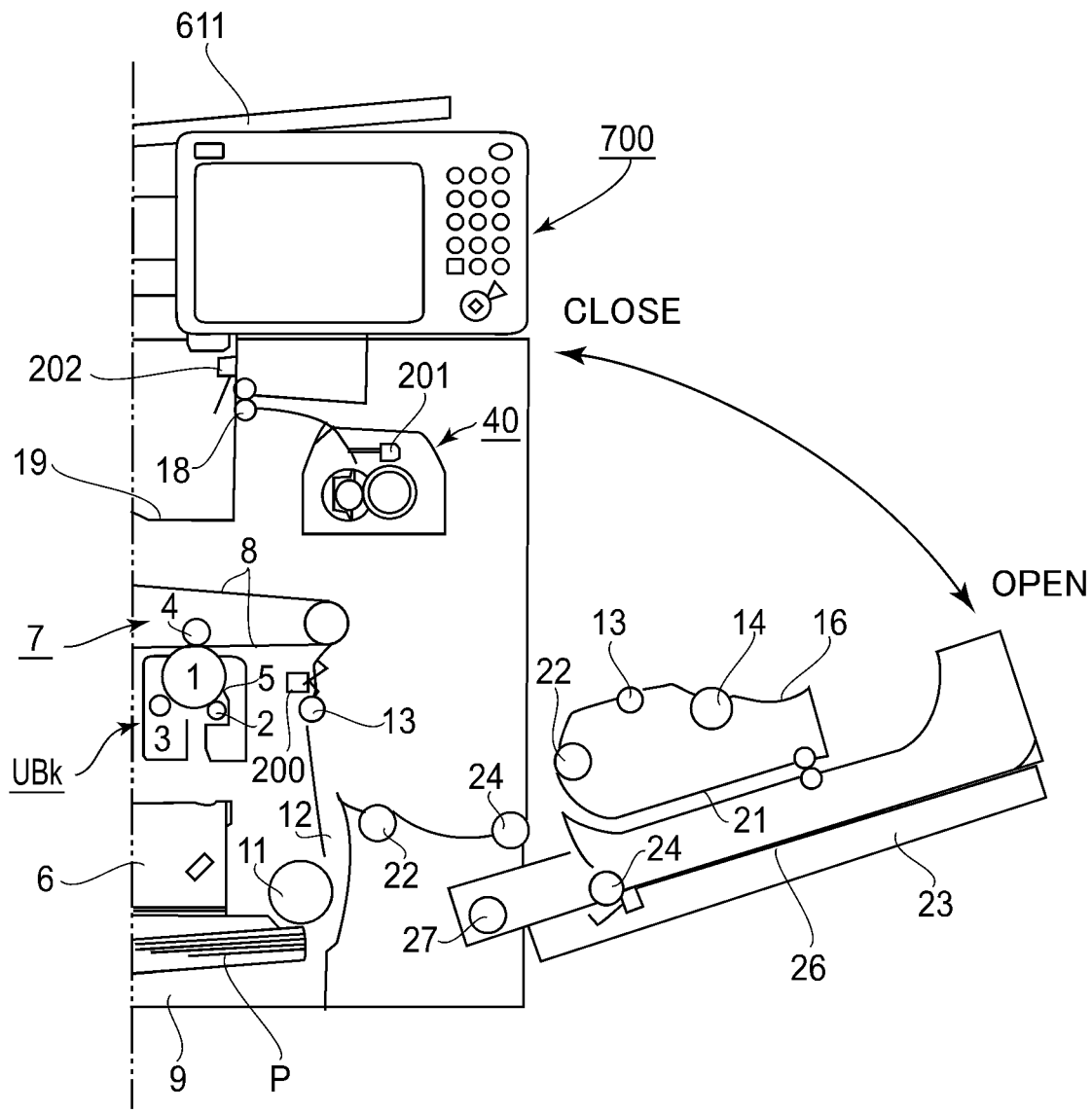
FIG. 4 is an illustration of a jam clearance operation.

As shown in FIG. 3, the controlling portion 800 includes an engine controller 802 for mainly controlling units related to image formation of the engine portion 600, and a main controller 801 for controlling the entire copying machine and for controlling the image reading portion 601.

The engine controller 802 is provided with a CPU (ENG) 810 as control means for controlling the image forming operation. Further, the engine controller 802 is provided with a ROM (ENG) 811 storing a program to be executed by the CPU (ENG) 810 beforehand, and a RAM (ENG) 812 storing variables and the like of the program executed by the CPU (ENG) 810.

The ROM (ENG) 811 stores conditions for forming an image, such as the size and type of the sheet P, an image forming color mode, and a single- or double-sided image forming mode. Also, it also stores a control condition table for selectively guiding image forming conditions on the basis of detection results from a temperature/humidity detecting member (not shown) a roller temperature detecting member (not shown) and the like, and control conditions such as a rotational speed of a motor corresponding to an image forming mode. Among the control conditions stored in the ROM (ENG) 811, the RAM (ENG) 812 stores, the conditions which need to be changed by the user or for maintenance, variables and operation values used for various controls, and rewritable settings depending on the situation.

The main controller 801 includes a CPU (CNT) 820 as control means for controlling the entire copying machine, controlling image reading, and for controlling the operating portion 700. That is, the CPU (CNT) 820 functions as a display controlling portion which controls display on the touch panel 702 in the operating portion 700. The main controller 801 includes a ROM (CNT) 821 storing beforehand a program executed by the CPU (CNT) 820, and a RAM (CNT) 822 storing variables of the program executed by the CPU (CNT) 820.

In addition, the main controller 801 includes an RTC (Real-Time Clock) 830 functioning as of a time counter for an operation to be performed with a time difference.

The ROM (CNT) 821 stores as conditions for controlling the operating portion 700 and the image reading portion 601, control and setting conditions for copy operation, control, settings, conditions for image reading, and control, settings and conditions for facsimile transmission and reception.

Among the control conditions stored in the ROM (CNT) 821, the RAM (CNT) 822 stores, conditions which need to be changed by the user or for maintenance, and variables and operation values to be used for various controls, and settings which are rewritable depending on the situation. The ROM (ENG) 811 and the RAM (ENG) 812 store three main operating modes of the engine portion 600, including an image forming mode M1, a standby mode M2, and a low power mode M3. The copy machine A can selectively execute the operations in these modes.

In the image forming mode M1, the engine portion 600 can form the image and the image reading portion 601 can read the image. In the standby mode M2, the engine portion 600 is in a preparation state prepared for image formation, and the image reading portion 601 is in a state of capable of reading the image. In the low power mode M3, the engine portion 600 and the image reading portion 601 are in a rest state.

In the low power mode M3, the CPU (CNT) 820 of the main controller 801 is in a restless operation state, and the CPU (ENG) 810 of the engine controller 802 is in a rest state (power supply is OFF) to save the operating power. That is, in the low power mode M3, the controlling portion 800 is in the rest state to reduce the power in the non-image forming state of the copying machine A.

The RTC 830 is an IC having a timer function, is written with the set time stored in the ROM (CNT) 821, and has a timer function for producing an operation signal after elapse of a set time from a certain trigger.

In the RTC 830, a timer ON or a timer OFF for enabling/disabling a timer function can be selected by a timer SW button 831 in a next layer screen (not shown) in which a setting button 723 provided on the touch panel 702 is pressed. This setting operation can be carried out by operating the operating portion 700 by the operator. In this embodiment, the ON state of the timer SW button 831 is the initial setting.

In this embodiment, as will be described hereinafter, a control mold operation can be performed in which the pressure release operation is carried out so that the pressing mechanism of the fixing device 40 moves from the first position to the second position after a predetermined time has elapsed from the end of the execution of the image forming job. In this embodiment, the timer SW button 831 is a manual operating portion capable of selectively setting whether to execute the control mode. When the user turns it on the timer SW button 831, the control mode is set to be executed, and when the user turns it off, the control mode is set for non-execution.

The image reading portion 601 includes, as means for reading the document or documents, a original document table 610 for reading a single document and an automatic document feeder 611 for reading multiple documents (a device for automatically feeding documents to a document reading unit: ADF).

The document table 610 is an image reading portion for reading one image, and is used to read an image of a single document or a book. It mainly comprises a platen reading unit (not shown) and a pressure plate unit (not shown), and an original document is placed on the platen reading unit (not shown) and confined by the pressure plate, and in the state, the copy start button 710 and a scan button 721 on the touch panel 702 are depressed. by doing so, the image is read using the platen reading unit (not shown).

The ADF 611 is used for reading the images while automatically feeding the documents, and is capable of continuously reading a plurality of documents. It mainly comprises an ADF reading portion (not shown) and a document feed portion (not shown), and the document is placed on the document feed portion (not shown), and a copy start button 710 of the operation portion 700 and a scan button 721 of the touch panel 702 are pressed. By doing so, an image is read by the ADF reading portion (not shown) while the document is being automatically fed. The document feeder (not shown) is provided with a document detection sensor (not shown) for detecting the presence or absence of the document.

In the document reading operation, the image is read from the document placed on the table 610 or in the ADF 611, data of the image is converted into an electric signal, and is transmitted to the laser scanner 6 of the engine portion 600.

The engine portion 600 includes an image forming portion 10 for forming the toner image. The image forming portion 10 includes an image forming unit UY for forming a Y (yellow) color toner image, an image forming unit UM for forming an M (magenta) color toner image, and an image forming unit UC for forming a C (cyan) color toner image, and Bk (black) color toner image. Further, the image forming portion 10 has a laser scanner unit 6 and an intermediary transfer belt unit 7. Each of the image forming units U is an electrophotographic process mechanism, and includes a photosensitive drum 1, a charger 2, a developing device 3, a primary transfer charger 4, and a drum cleaner 5.

The electrophotographic process and the image forming operation of the image forming portion 10 having such a structure are known, and therefore, the description thereof is omitted. The toner images of respective colors are primary-transferred from the drum 1 of the image forming units U onto a rotating belt 8 of the intermediary transfer belt unit 7 in a predetermined superimposed manner. By this, a color toner image of four colors of Y+M+C+Bk is formed on the belt 8.

On the other hand, when the sheet feed roller 11 of the cassette sheet feed portion is driven at a predetermined control timing, the paper P stacked and stored in the paper feed cassette 9 is fed out one by one, and the sheet is fed to a pair of registration rollers 13, by way of a sheet feed path 12, The registration roller pair 13 receives the sheet P, and straightens the sheet P if the sheet P is obliquely fed. Then, the registration roller pair 13 feeds the sheet P to a secondary transfer portion 15 which is a pressure nip formed between the belt 8 and the secondary transfer roller 14 in synchronization with the toner image on the belt 8. The color toner image of four colors on the belt 8 is secondarily transferred collectively by the secondary transfer roller 14 onto the sheet P.

The sheet P which has passed through the secondary transfer portion 15 passes through a pre-fixing conveyance path 16 and is introduced into the fixing device (fixing portion) 40 through a entrance facing downward. The sheet P is conveyed to the fixing device 40 and heated and pressed so that the toner image is fixed on the sheet P.

In the case of a single-sided image forming mode in which a toner image is formed (printed) on only one side of the sheet P, the sheet P fed upwardly from the upward outlet of the fixing device 40 is moved to a discharge roller 18 by a switching flapper 17. The sheet is guided and discharged to the discharge tray 19 as a single-sided print.

In the case of a double-sided image forming mode in which toner images are formed on both sides of the sheet P, the sheet P on which single-sided image is formed is discharged from the fixing device 40 is conveyed to the tray 19 by the sheet discharging roller 18, and when the trailing end portion thereof departs the fixing device 40 and reaches a reversal point 20, the paper discharge roller 18 is reversely rotated. By this, the sheet is switched back and introduced into a duplex transport path 21.

The sheet P is then re-introduced into the post-feeding conveyance path 12 on the front side of the registration roller pair 13 by the conveyance rollers 22 through the double-sided conveyance path 21 in a reversed state. Thereafter, the sheet P is discharged to the sheet discharge tray 19 as a double-sided print having the toner image formed on the other surface through the same process as in the single-sided image forming mode.

The portion constituted as the flapper 17 and the switch-back function portion the discharge roller 18 is an example of a reversing device. In this embodiment, the sheet is reversed by the sheet discharging roller 18, but in order to increase the productivity of printing (image formation), the sheet may be reversed at a position different from that of the discharge roller 18, by providing a reversing unit, a plurality of sheet discharging units, or the like.

A manual paper feed portion (manual feed tray) 23 is provided on the outer periphery of the engine portion 600 as a paper feed portion other than the paper feed cassette 9. The manual paper feed portion 23 is provided for the purpose of enhancing the user operability so that the user can easily set the sheet P when an image is to be formed on a sheet P of a type other than that of the sheet P stored in the sheet feed cassette 9.

In image formation by sheet feeding (sheet feeding) from the manual sheet feeding unit 23, the sheet P set in the manual paper feeding unit 23 is fed out one at a time, by driving a sheet feeding roller 24 at a predetermined control timing. The paper P passes through a transport path 25 and is introduced to the post-feed transport path 12 by the transport rollers 22 on the front side of the registration roller pair 13. Thereafter, image formation is performed in the same manner as in the case of the sheet fed from the sheet feeding cassette 9.

A sheet detection sensor is provided in the transport path as a means for detecting the state of the sheet P being transported in the transport path. In the copying machine A of FIG. 1, a registration sensor 200 detects the sheet downstream of the registration roller pair 13. Further, a inner sheet discharge sensor 201 detects the sheet downstream of the fixing device 40. Further, the sheet discharge sensor 202 detects the sheet downstream of the paper discharge roller 18. The CPU 810 of the engine controller 802 selectively proceeds to the next step in response to the detection signals of the sensors 200, 201, and 202.

For example, if the ON time of one of the sensors is longer than a time period preset in the sequence while the paper P is being conveyed on the conveyance path, or if the arrival at any of the sensors is later than the time preset in the sequence, the CPU 810 determines that the paper is jammed somewhere (occurrence of jam). Then, the CPU 810 stops a drive unit (not shown) for each roller on the basis of the detection signal so that the state of the paper jam does not become worse.

for the purpose of removing the jammed sheet after the sheet a sheet P is jammed inside the apparatus, and the sensors detect the jam, the engine portion (apparatus main assembly) 600 is provided with a door 26 which is rotatable to the right (openable) about a hinge 27. The pre-fixing conveyance path 16, the secondary transfer roller 14, and one of the registration roller pairs 13 (the right side in the drawing) are provided on the door 26. Therefore, when the door 26 is opened, the conveyance paths other than the fixing device 40 are opened between the post-feeding conveyance path 12 and the discharge rollers 18. By this, it is possible to easily remove the paper which has jammed in the transport path.

When the manual feed unit 23 is not used, it can be folded and stored on the outer surface of the door 26 as shown by a chain line in FIG. 1. when it is used, the manual feed unit 23 can be opened from the outer surface of the door 26 outward to a predetermined inclination angle as shown by the solid line in FIG. 1.

[Fixing Device]

Figure 5:
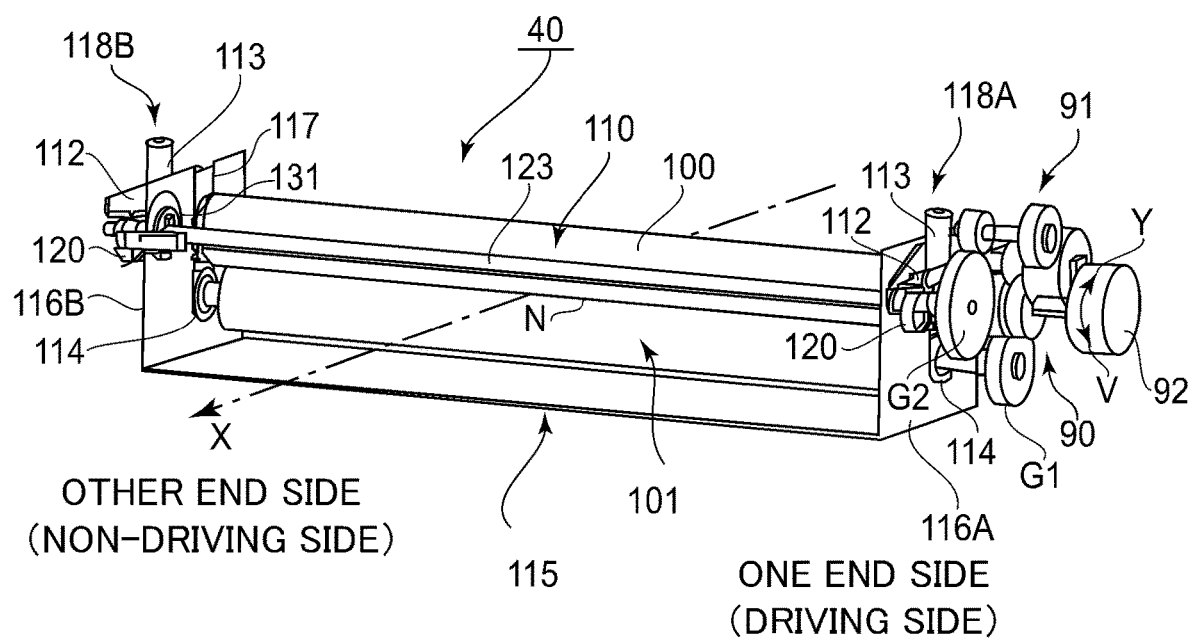
FIG. 5 is an external perspective schematic view of a fixing device.
Figure 6:
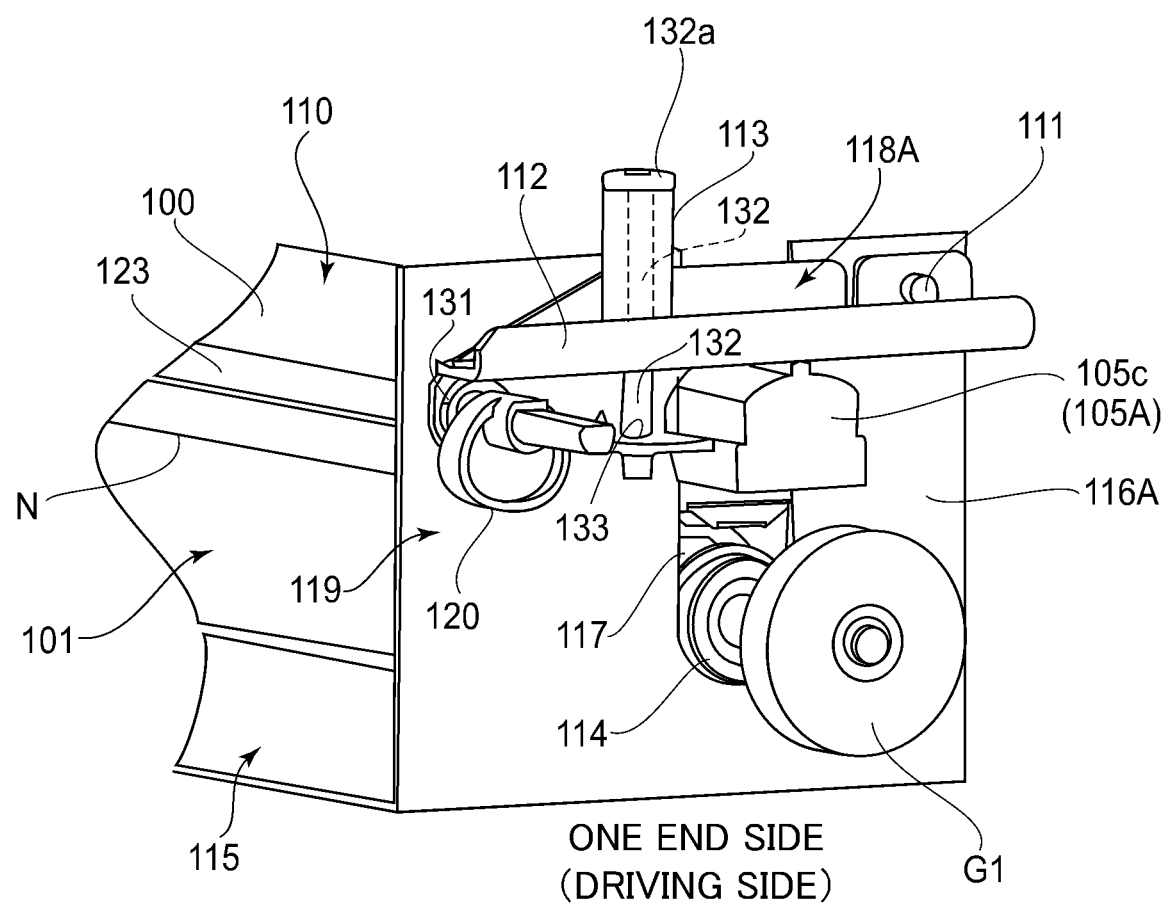
FIG. 6 is a schematic perspective view of a major part at one longitudinal end (driving side) of the fixing device.
Figure 7:
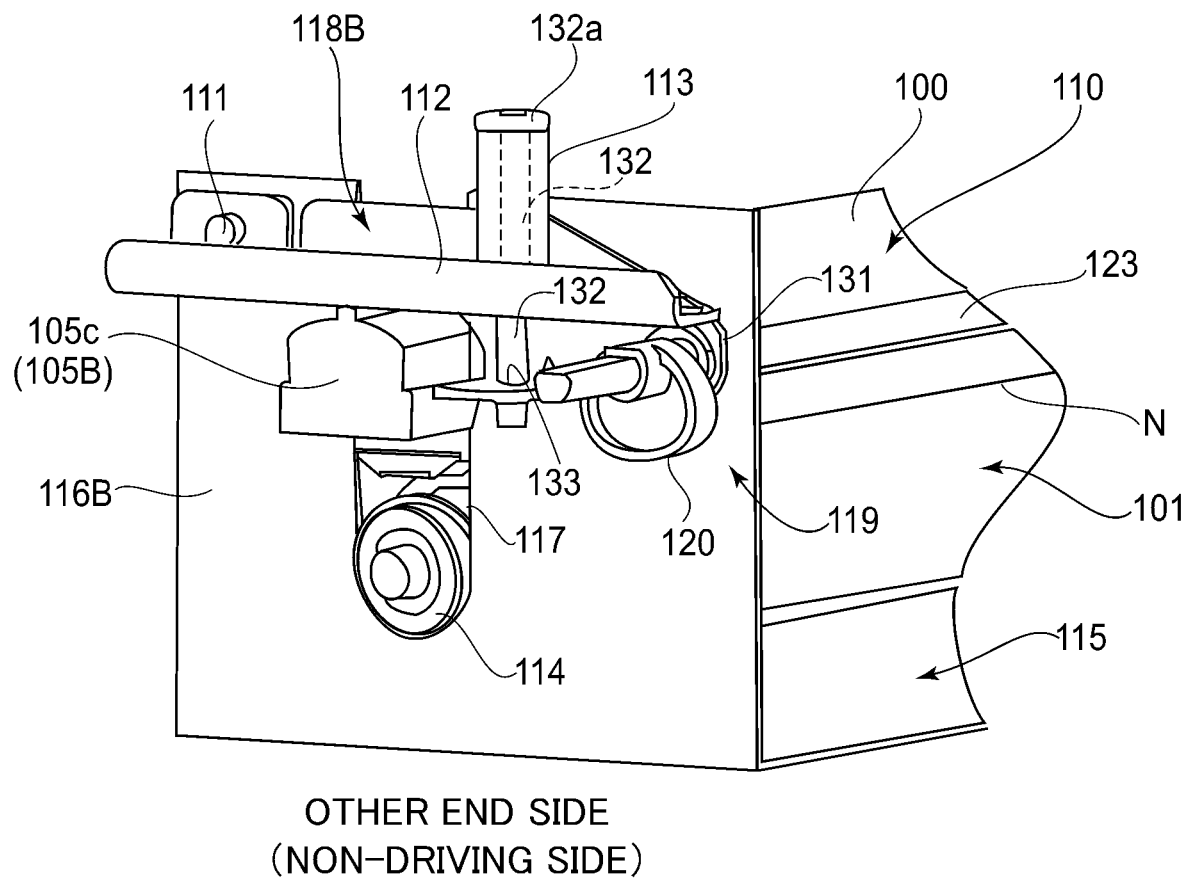
FIG. 7 is a schematic perspective view of a major part at the other longitudinal end (non-driving side).
Figure 8:
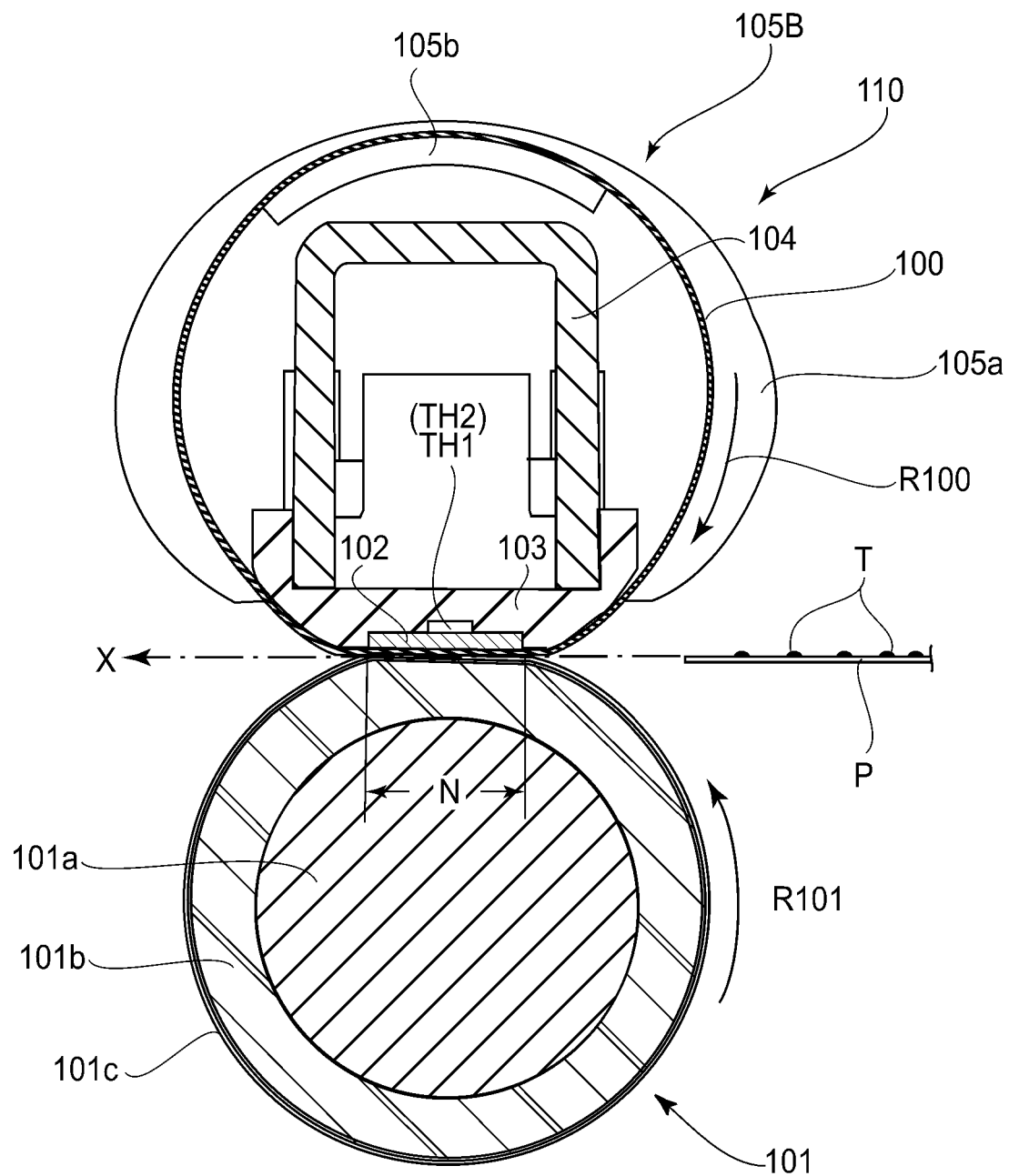
FIG. 8 is an enlarged schematic cross-sectional view of a major part of the fixing device.

FIG. 5 is a schematic perspective view of a appearance of the fixing device 40. FIG. 6 is a schematic perspective view of a major part at one longitudinal end (drive side) of the fixing device 40, and FIG. 7 is a schematic perspective view of a major part at the other longitudinal end (non-drive side). FIG. 8 is a schematic sectional view of a major part of the fixing device 40.

The fixing device 40 is a belt (film) heating type image heating device. The fixing device 40 is roughly divided into a fixing belt unit 110 having an elastic fixing belt (fixing film: first rotatable member) 100, an elastic pressure roller (second rotatable member) 101, and a fixing frame accommodating them (device casing 115). Hereinafter, the fixing belt unit 110 is simply referred to as a unit 110. A nip portion (fixing nip portion) N is formed by cooperation between the fixing belt 100 and the pressure roller 101 constituting a pair of rotatable members. The nip portion N is a portion where the sheet P carrying the unfixed toner image T is nipped and conveyed, by which the toner image is fixed by heat and pressure.

Figure 9:
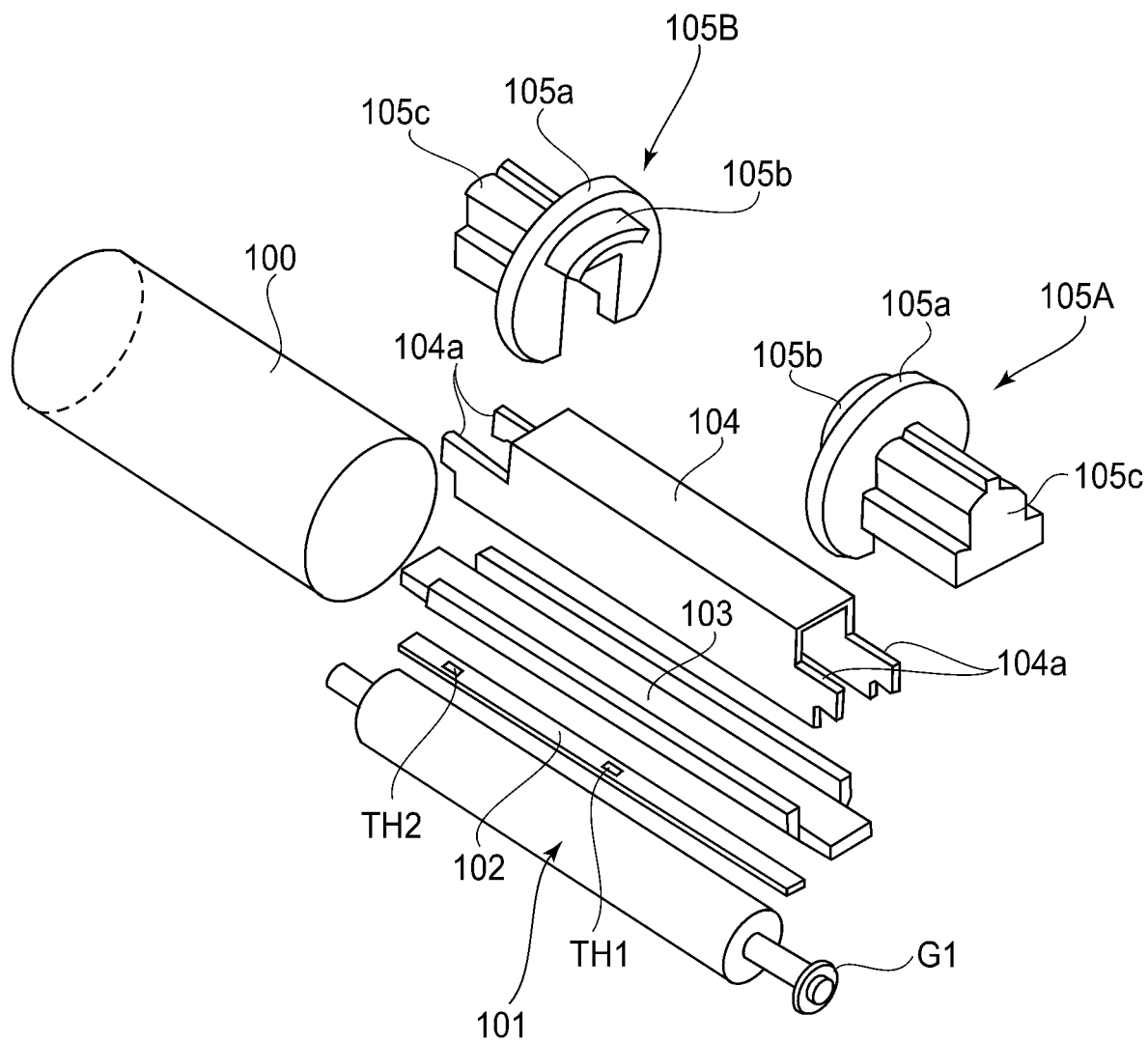
FIG. 9 is an exploded perspective schematic view of a fixing belt unit.

As shown in FIG. 8, the unit 110 is an assembly including the cylindrical fixing belt 100, a heater holder (pressing member) 103, a heater (heating member) 102, a pressing stay (belt frame) 104, and a flange member (belt guide) 105A, 105B or the like. FIG. 9 is a schematic exploded perspective view of the unit 110, and also shows the pressing roller 101.

(1) Fixing Belt

The fixing belt 100 (hereinafter, simply referred to as the belt 100) is a thin, hollow endless belt-like heat transfer member having flexibility and heat resisting property. The belt 100 is made of a heat-resistant resin such as a polyimide film or a PEEK film having a total thickness of 150 μm or less in order to reduce the heat capacity and improve the quick start property. An elastic layer of a rubber material having high thermal conductivity is formed on the resin layer to which the conductive material is applied so that the thermal conductivity increases, and a parting layer of fluororesin is provided on the surface into an endless shape having an inner diameter φ25 mm.

In this embodiment, the base layer is made of polyimide having a thickness of 30 μm, the elastic layer is made of silicone rubber having a thickness of 70 μm and thermal conductivity of 1.0 W/mK, and the parting layer is made of a PFA tube having a thickness of 30 μm. The PFA layer is preferably a sheet or a coat layer having high parting properties, and a fluororesin layer, for example can be used. Further, a sheet-like member having high heat resistance, typically polyester, polyethylene terephthalate, polyimide amide, or the like may be used as a base layer, and a conductive layer may be further formed thereon, and a surface parting layer may be further formed thereon.

(2) Heater Holder

The heater holder 103 is a nip forming member which fixedly supports the heater 102. The heater holder 103 is a heat-insulating member, such as a heat-resistant resin, having a substantially semicircular trough-shaped cross section and elongated along the longitudinal direction (width direction) of the belt 100. From the standpoint of energy saving, it is desirable to use a material which is low in heat conduction to the pressure stay 104, and for example, heat-resistant glass, heat-resistant resin such as polycarbonate, liquid crystal polymer, or the like is used.

(3) Heater

The heater 102 is a low-heat-capacity horizontally elongated plate-like heating element, a temperature of which rises sharply by energization, and it is a ceramic heater in this embodiment. The heater 102 forms a heating element by printing and baking a thick film of Ag/Pd paste on an elongated thin plate-like AlN substrate having high thermal conductivity. Then, a ceramic heater in which a glass coating layer having a thickness of about 50 to 60 µm is integrally provided as a sliding insulating member on the heating element. In this embodiment, the heating resistance layer is formed on the AlN substrate having a thickness of 600 µm. The heater 102 is fitted and held in a groove formed in the outer surface of the heater holder 102 along the length of the holder.

On the other hand, a chip-shaped thermistor TH1 is provided on the substrate opposite to the side on which the heating element is provided with the AlN substrate interposed therebetween. The thermistor TH1 is adhered and fixed on an electrode pattern previously formed by thick film printing on the opposite side of the region where the heating element is provided, and it monitors the temperature of the AlN substrate. Further, a thermistor TH2 is provided at a position in the neighborhood of the end of the heating element. The thermistors TH1 and TH2 are fixed to the substrate at a predetermined pressure by a pressing means such as a spring (not shown) in order to detect a temperature exceeding the heat resistant temperature of the adhesive.

(4) Pressing Stay

The pressure stay 104 is a rigid member which is elongated along the width direction of the belt 100 and is a rigid member which receives a reaction force from the pressure roller 101, and is preferably made of a material which does not easily bend even when high pressure is applied, and this embodiment uses a SUS304 member having a U-shaped cross section. The pressure stay 104 is disposed inside the heater holder 104 and supports the heater holder 104.

(5) Flange Member

The belt 100 is loosely fitted (externally inserted) around the assembly of the heater holder 103, the heater 102, and the pressure stay 104. Opposite ends 104a of the pressure stay 104 project outward through openings at the opposite ends of the belt 100, respectively. Flange members 105A and 105B are fitted to opposite end portions 104a of the pressure stay 104, respectively. The belt 100 is located between the opposed flange portions 105a and 105a of the fitted flange members 105A and 105B. The flange members 105A and 105B are regulating members for restricting longitudinal movement and the circumferential shape of the belt 100 in the unit 110.

The flange members 105A and 105B are molded products of heat-resistant resin material such as PPS, liquid crystal polymer, and phenol resin, and each has a flange portion (flange seat portion) 105a, a shelf portion 105b, and a pressed portion 105c.

The flange portion 105a is a portion that receives the end surface of the end of the belt 100 and restricts the movement of the belt 100 in the thrust direction, and has an outer shape larger than the outer shape of the belt 100. The shelf portion 105b is in the form of an arc on the inner surface side of the flange portion 105a, and holds the inner surface of the belt end portion to maintain the cylindrical shape of the belt 100. The pressed portion 105c is provided on the outer surface side of the flange portion 105a, and receives a pressing force provided by pressing mechanisms 118A and 18B described hereinafter.

(6) Pressure Roller

The pressure roller 101 includes a core made of a cylindrical metal 101a of metal such as iron or aluminum, and has an elastic layer 101b of a soft rubber material such as sponge or silicone rubber on the outer peripheral side of the cored metal, and a PFA layer as a parting layer 101c.

In this embodiment, the surface of the core metal 101a of iron or aluminum is subjected to a surface roughening treatment such as blasting, and then washed, and then the core metal 101a is inserted into a cylindrical mold, and the liquid silicone rubber is injected into the mold and is heat-cured to form an elastic layer 101b. At this time, in order to form the resin tube layer such as the PFA tube on the surface of the elastic layer 101b as the parting layer 101c, a tube coated in advance with a primer on the inner surface is inserted into the mold. By doing so, the tube 101c and the rubber layer 101b are bonded together with the heat curing of the rubber as the elastic layer 101b. The pressure roller 101 thus molded is subjected to a secondary vulcanization after the demolding treatment.

In this embodiment, the diameter of the core metal 101a of the pressure roller 101 is 15 mm, the thickness of the elastic layer 101b is 5 mm, the silicone rubber having an Asker hardness of 64, the thickness of the PFA tube of the parting layer 101c being 50 µm, and the outer diameter being about φ25 mm, thus providing the pressure roller 101.

One end and the other end of the cored bar 101a of the pressure roller 101 are rotatably supported by bearings 114 between the side plates 116A and 116B at one end and the other end of the fixing frame 115, respectively.

The unit 110 is arranged in parallel with the pressure roller 101 such that the heater (102) side faces the pressure roller 101 between the side plates 116A and 116B. The pressed members 105c of the flange members 105A and 105B of the unit 110 are fitted in guide holes 117 formed symmetrically with the side plates 116A and 116B so as to be slidable toward the pressure roller 101.

The flange members 105A and 105B receive a predetermined pressing force in the direction toward the pressing roller 102 by the pressing mechanisms 118A and 118B, which will be described hereinafter, in the pressed portion 105c, respectively. In this embodiment, the pressing force is 125 N on each side, and the total pressing force is 250 N.

By the pressing force, the entirety of the flange members 105A and 105B of the unit 110, the pressure stay 104, and the heater holder 103 is pressed toward the pressure roller 101. Therefore, the heater holder 103 and the heater 102 are pressed against the pressure roller 101 by way of the belt 100 with the predetermined pressing force against the elasticity of the elastic layer 01 b, so that the nip portion N having a predetermined width in the transport direction X is formed between the belt 100 and the pressure roller 101.

(7) Fixing Operation

On one end side of the core metal 101a of the pressure roller 10, a drive gear G1 is concentrically and integrally provided 1. The driving force of the fixing motor (drive source) 92 controlled by the CPU 810 is transmitted to the gear G1 by way of the drive transmission mechanism of the fixing drive unit 90. By this, the pressure roller 101 is rotationally driven at a predetermined speed in the counterclockwise direction of a arrow R101 in FIG. 8. By the pressure roller 101 being rotationally driven, a rotational torque is applied to the belt 100 at the nip portion N by a frictional force relative to the pressure roller 101.

By this, the belt 100 is driven to rotate clockwisely as indicated by an arrow R100 around the outer periphery of the heater holder 103 and the pressing stay 104 while the inner surface of the belt 100 is in sliding close contact with the heater 102 and a part of the heater holder 103 in the nip portion N. The rotation peripheral speed of the belt 100 substantially corresponds to the rotation peripheral speed of the pressure roller 101. A lubricant (not shown) is applied beforehand to sliding surfaces of the belt 100, the heater 102, and the heater holder 103 in order to reduce the frictional force. The lubricant is an oil in this embodiment. As for the oil, a silicone oil which can be used in a high-temperature environment is preferable.

The CPU 810 starts electric power supply from a power supply unit (not shown) to the heater 102. Although a power supply path from the power supply unit to the heater 102 is omitted in the drawing, the power supply path is provided by way of a wiring and a connector which electrically connect the power supply unit with the heater 102. This electric power supply raises the temperature of the heater 102 rapidly. The thermistor TH1 outputs a signal indicative of the temperature of the heater 102 to the CPU 810. The CPU 810 controls the power supplied from the power supply unit to the heater 102 such that the heater temperature rises to a predetermined target set temperature and is controlled based on the heater temperature detected by the thermistor TH1.

In the above-described fixing device, the sheet P on which the unfixed toner image T has been formed is introduced from the image forming unit 10 into the fixing device 40, and is nipped and fed at the nip N. Heat of the heater 102 is applied through the belt 100 in the process of nipping and feeding by the nip portion N of the sheet P. The unfixed toner image T is melted by the heat of the heater 102 and is fixed on the sheet P by the pressure applied to the nip N.

(8) Pressing Mechanism

Outside the side plates 116A and 116B at one end and the other end of the fixing frame 115, the pressure mechanisms 118A and 118B at one end and the other end are provided, respectively. The two pressing mechanisms 118A and 118B have the same structure in a symmetrical structure, and therefore, the pressing mechanism 118A at one end will be described as a representative.

The pressure mechanism 118A includes a pressure lever 112 and a pressure spring 113. A base side The pressing lever 112 is mounted on the side plate 116A so as to be pivotable about an axis of the shaft 111. The pressure lever 112 extends from the shaft portion 111 to the opposite side with the position of the pressed portion 105c of the flange member 105A interposed therebetween. The pressure spring 113 is an elastic member which rotationally urges the pressure lever 112 around the shaft 111 in a direction in which the pressure lever 112 is pressed against the pressed portion 105c of the flange member 105A.

In this embodiment, a through hole (not shown) is provided in the pressing lever portion opposite to the shaft portion 111 with respect to the pressed portion 105c, and a long pressure adjusting screw 132 is inserted through the hole, and a there is provided of the screw is threaded into a screw hole 133 in the side plate 116A. A coil-shaped pressure spring 113 is externally fitted to a screw portion between the head (seat surface) 132a of the screw 132 and the pressure lever 112 and is contracted therebetween. Therefore, in a free state, the pressing lever 112 abuts on the pressed portion 105c of the flange member 105A by a compression reaction force of the pressing spring 113 to apply the pressing force.

By tightening the screw 132, the head 132a of the screw 132 shortens the spring length of the pressing spring 113, by which the spring load applied to the pressing lever 112 can be increased. The pressure lever 112 is rotatably supported on the side plate 116A, and therefore, a rotation moment is produced around the shaft 111 by the compression reaction force of the pressure spring 113, so that the flange member 105A is pressed toward the pressure roller 201 at a predetermined pressure.

The pressing mechanism 118A at one end has been described above, but the pressing mechanism 118B at the other end is the same as the pressing mechanism 118A at the one end.

(9) Pressure Release Mechanism

Release of the pressing force by the pressing mechanisms 118A and 118B on one end and the other end is performed by a pressing release mechanism (moving mechanism) 119. In this embodiment, the pressure release mechanism 119 has cams 120 at one end and the other end for swinging the pressure levers 112 of the pressure mechanisms 118A and 118B at the one end and the other end.

The two cams 120 have the same shape with a predetermined amount of eccentricity, and are fixed in the same phases to one end and the other end of a camshaft 123 which is rotatably supported between the side plates 116A and 116B by bearings 131 and 131, and is rotatable in the same phase as the cam shaft 123. The cams 120 on the one end side and the other end side are respectively positioned corresponding to the free end sides of the pressing lever 112 of the pressing mechanisms 118A and 118B on the one end side and the other end side.

A drive gear G2 is concentrically and integrally fixed to one end of the cam shaft 123. The driving force of the fixing motor 92 controlled by the CPU 810 is transmitted to the gear G2 by way of the driving transmission mechanism of the cam driving portion 91.

Figure 10:
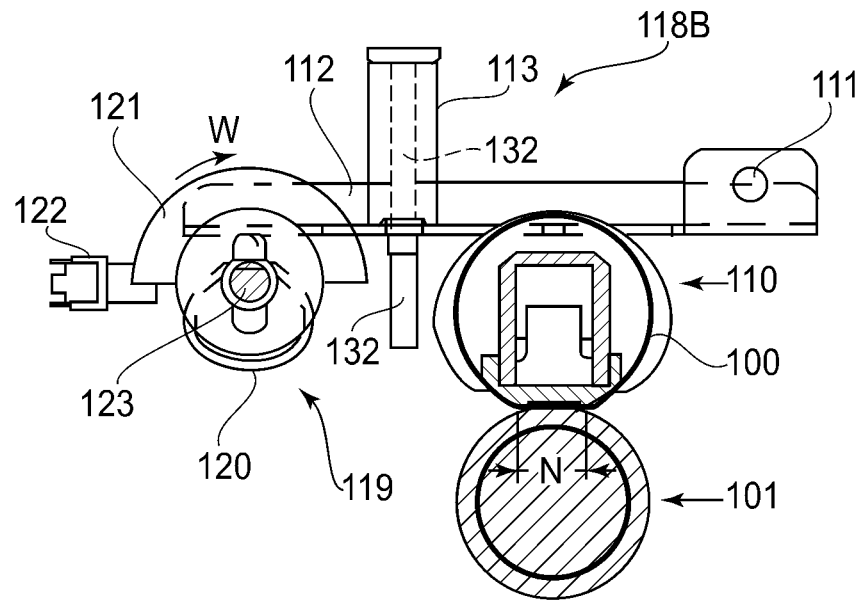
FIG. 10 is a schematic view when the fixing device is in a pressurized state.

FIG. 10 shows a state in which the belt 100 and the pressure roller 101 are in pressure contact with each other to form a nip portion N having a predetermined width therebetween. In this state, the rotation angle is such that the smallest protruded portions of the cams 120 on one end and the other end of the pressure release mechanism 119 are opposed, without contact, to the pressure levers 112 of the pressure mechanisms 118A and 118B on the one end and the other end, respectively.

Therefore, the pressure lever 112 is in a free state, and the flange members 105A and 105B at one end and the other end are respectively pressed by the pressure spring 113 and the pressure lever 112 of the pressure mechanisms 118A and 118B at one end and the other end. By this, the belt 100 and the pressure roller 101 are kept in pressure contact with each other, and a nip portion N having a predetermined width is formed therebetween (first position).

Figure 11:
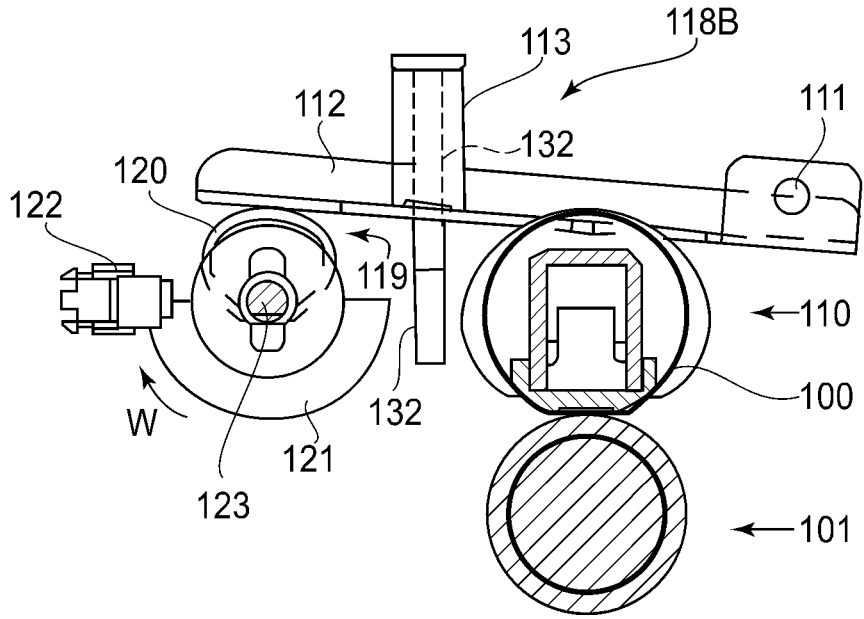
FIG. 11 is a schematic view of the fixing device when the pressure is released.

FIG. 11 shows a state in which the pressure is released. In the pressurized state shown in FIG. 10, the driving force of the fixing motor 92 is transmitted to the gear G2 by way of the drive transmission mechanism of the cam drive unit 91, and the cam shaft 123 is rotated in the same phase. Then, the rotation angle position is such that the highest protrusion position is opposed to the pressure levers 112 at one end and the other end.

Then, the pressure levers 112 on the one end side and the other end side are pushed up by the cams 120 in the direction of separation from the pressed portions 105c of the flange members 105A and 105B on the one end side and the other end side by the cam 120, respectively. By this, the pressure between the fixing belt 100 and the pressure roller 101 is released (second position).

(10) Pressure Release Control and Pressure Control

The pressure release operation is performed to improve the operability of removing the jammed paper when the paper P is jammed while the paper P is being fed in the nip portion N. In addition, the pressure between the belt 100 and the pressure roller 101 is released so that no pressure contact mark is formed on the belt 100 and the pressure roller 101 due to a pressure contact state kept for a predetermined time or longer without driving the apparatus. That is, a control mode is executed in which the pressure release operation is performed so that the pressing mechanism of the fixing device 40 moves from the first position to the second position after a predetermined time has elapsed from the end of the execution of the image forming job.

There is provided a sensor flag 121 on the same axis as a cam shaft 123 which is a support shaft of the cam 120 as a means for detecting the pressure contact position and the pressure release position, in the rotation operation of the cam 120, and it rotates synchronously with the rotation of the cam 120, wherein the position in the rotation direction is detected by a contact/separation sensor 122. The contact/separation sensor 122 transmits infrared rays in the sensor, and the sensor flag 121 transmits a signal by either blocking or transmitting the infrared rays.

In the operation from the pressure contact state in FIG. 10 to the pressure release state in FIG. 11, the CPU (ENG) 810 stops the fixing motor 92 of the fixing drive unit 90 in response to a pressure release instruction signal from the engine controller 802. After the stop, the fixing motor 92 is driven to rotate in the motor reversing direction V (FIG. 5), which is the CCW direction, and the cam 120 starts to rotate in the W direction by the drive transmission through the driving path of the cam driving unit 92. Accordingly, the sensor flag 121 on the same axis as the cam shaft 123 rotates simultaneously.

Before the rotation of the sensor flag 121, the contact/separation sensor 122 is in a transmitting state, and during the rotation, the sensor flag 121 blocks the infrared irradiation area of the contact/separation sensor 122 while the transmission state is maintained, and in this state, the cam 120 is at the pressure release completion position. The pressure release state is detected by the transition of the output signal of the contact/separation sensor 122 at this time, and the pressure release is completed by stopping the fixing motor 92.

A pressure release instruction signal from the engine controller 802 is outputted when the paper detection sensors detect a jam, when the door 80 is opened, or the like. Further, the pressure release instruction signal is also outputted as a trigger after elapse of a predetermined time, using the time count of the RTC 830. The initial setting of the timer SW831 is ON, and therefore, in the state where the timer SW831 is used in the initial setting, the pressure is released upon elapse of the predetermined time as counted by RTC830 unless a pressurizing release command signal due to the detection of a jam by the paper detection sensor or the opening operation of the door 26, and so on.

As described above, in the RTC 830, the timer ON or the timer OFF for enabling or disabling the timer function can be selected by the timer SW button 831 in the next layer screen (not shown) in which the setting button 723 provided on the touch panel 702 is pressed. In this embodiment, the ON state of the timer SW button 831 is set initially.

The timer SW button 831 is a manual operating portion capable of selecting and setting whether to execute the control mode. When the user turns on the timer SW button 831, the control mode is set to be executed, and when the user turns it off, the control mode is not set.

Conversely, in the pressure contact operation from the pressure release state in FIG. 11 to the pressure state in FIG. 10, the pressing operation between the belt 100 and the roller 101 is started. First, the CPU (ENG) 810 drives the fixing motor 92 to rotate in the motor reversing direction V which is the CCW direction to start rotation of the cam 120 in the W direction by the drive transmission through the driving path of the cam driving unit 92. With this operation, the sensor flag 121 coaxial with the cam shaft 123 rotates simultaneously.

When the pressure is released, the contact/separation sensor 122 is in the light blocking state. When the sensor flag 121 is rotated to the pressure release completion position while maintaining the light blocking state while the sensor flag 121 is rotating, the sensor flag 121 passes through the infrared irradiation area of the contact/separation sensor 122, and the transmission state of the contact/separation sensor 122 is established. On the basis of the transition of the output signal of the contact/separation sensor 122 at this time, it is detected that the nip portion N is in the pressure contact state, and the fixing motor 92 is stopped, thereby completing the pressure contact.

The press-contact instruction signal from the engine controller 802 is outputted when the copying machine A enters a state of performing image formation while shifting to the image forming mode M1. The state in which image formation is performed is a state in which the copy button 720 is pressed or an image formation signal is inputted from an external device such as a PC (personal computer). Note that if the belt 100 and the pressure roller 101 are in a pressure-contact state at the time of transition to the image forming mode M1, no pressure-contact command signal is outputted.

(11) Mode Transition

Figure 12:
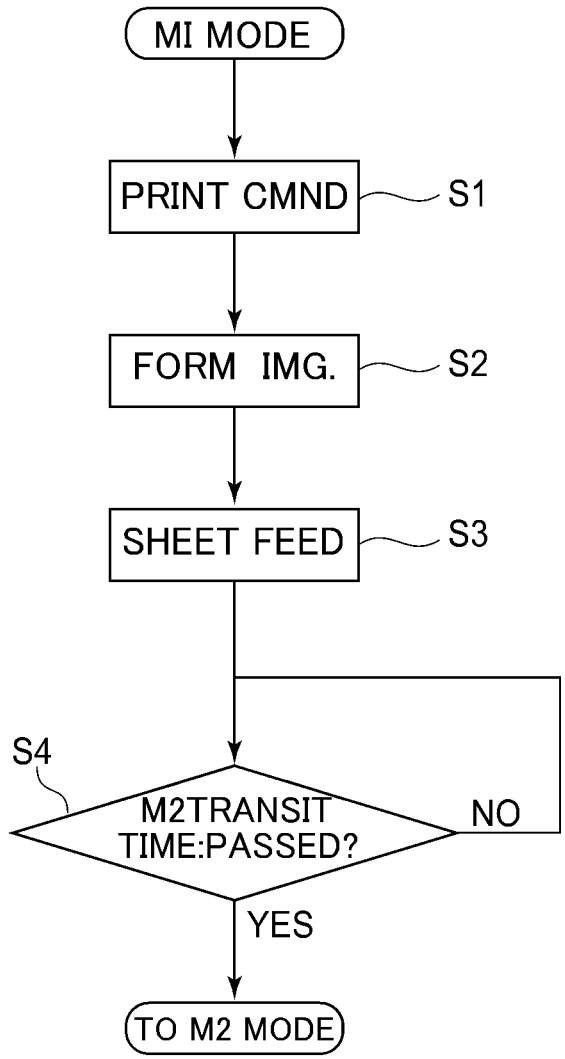
FIG. 12 is a flowchart in an image forming mode.
Figure 13:
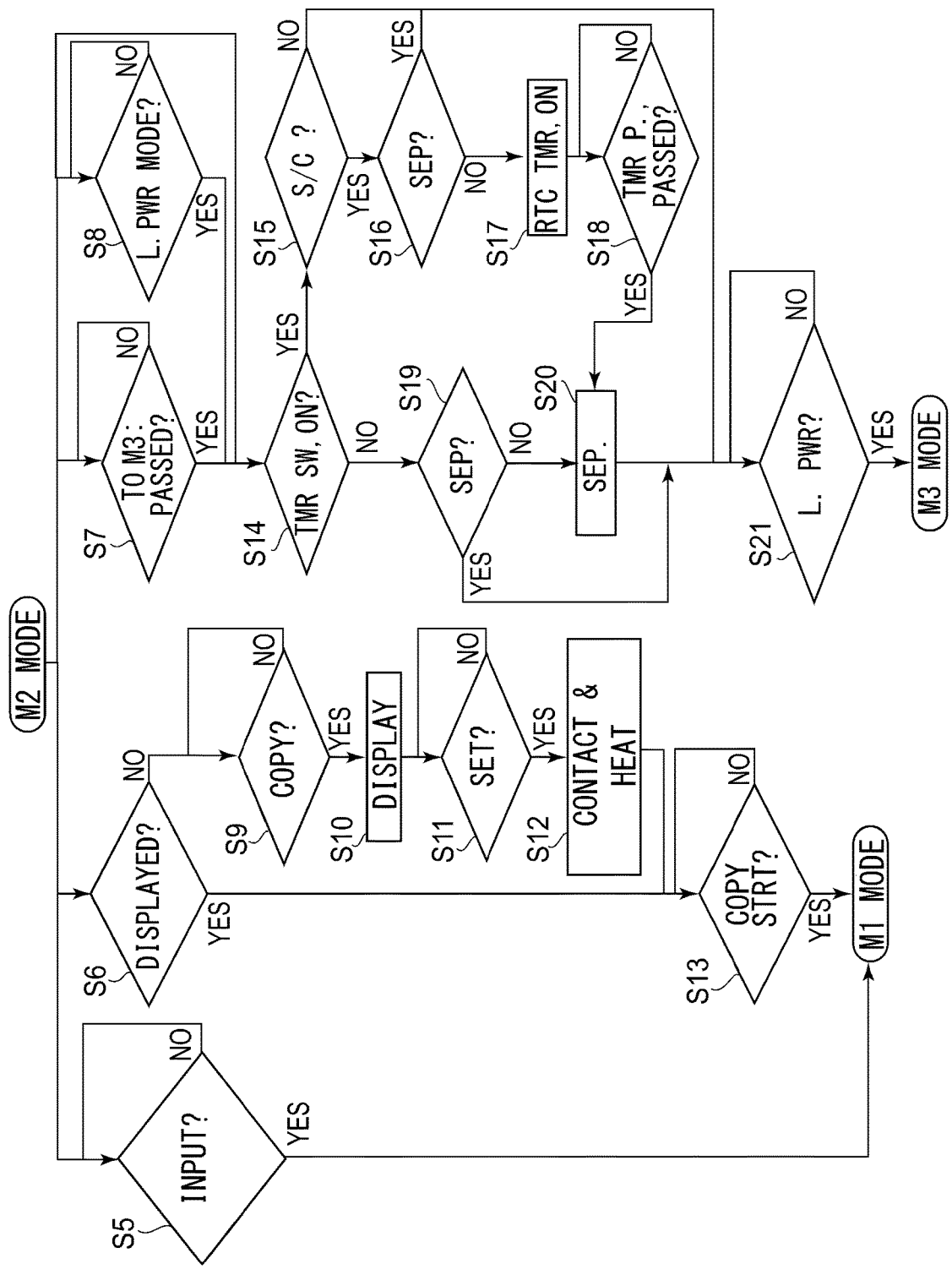
FIG. 13 is a flowchart in a standby mode.
Figure 14:
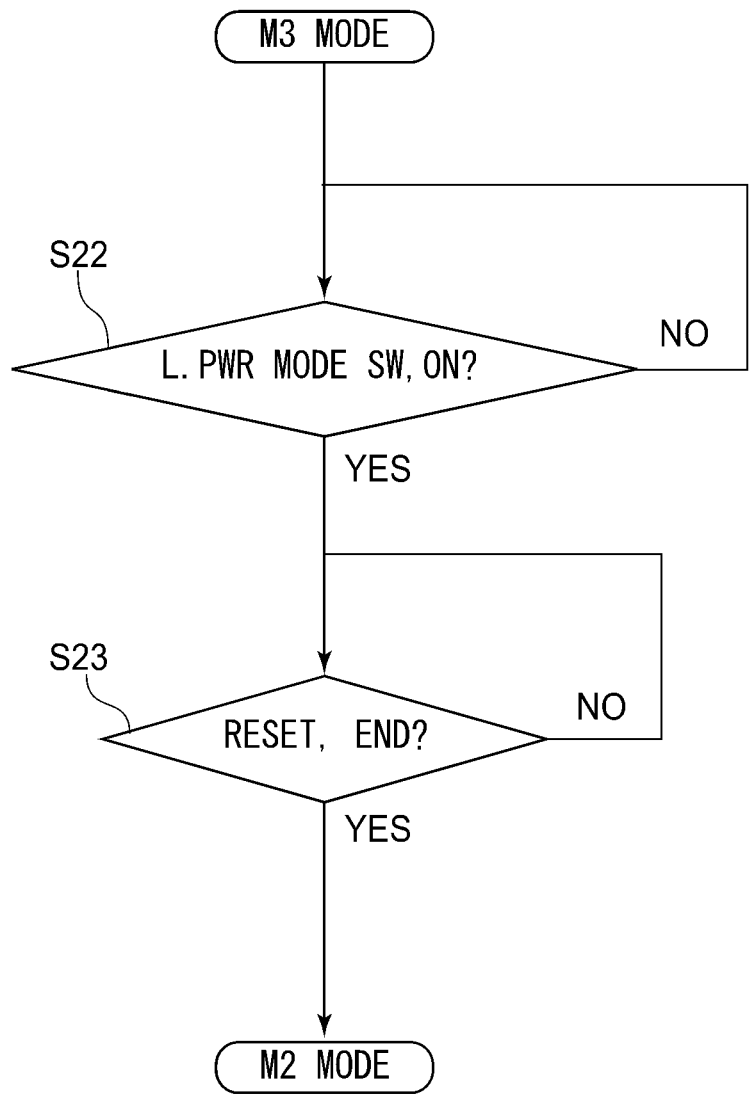
FIG. 14 is a flowchart of a low power mode.

Next, the description will be made as to a mechanism the shifting operation of the copying machine A to the image forming mode M1, the standby mode M2, and the low power mode M3, mainly with reference to FIGS. 12, 13 and 14. FIG. 12 is a flowchart of the image forming mode M1. FIG. 13 is a flowchart of the standby mode M2. FIG. 14 is a flowchart of the low power mode M3.

When the copying machine A completes image formation (an image forming job to be executed) from the state of the image forming mode M1 in the image forming operation state and passes a transition time to the standby mode M2 stored in the RAM (ENG) 812, the copy machine A shifts to the standby mode M2 (FIG. 12: S1 to S4). In this embodiment, the set value of the transition time to the standby mode M2 is set to 15 seconds (S4).

In accordance with the transition to the standby mode M2 (FIG. 13), the RTC 830 starts counting the time for the pressure release command (S14 to S17).

In this embodiment, the start trigger of the RTC 830 is used as a trigger of the transition to the standby mode M2, but this is not limiting to the present invention. The timing start trigger by the RTC 830 may be a trigger capable of measuring the time during which the RTC 830 is not substantially performing the fixing process (the time during which the image forming operation is not performed).

For example, a sensor for detecting a sheet downstream of the fixing device 40 in the transport direction may be provided, and the detection of the last sheet of the image formation job (when the sheet passing is completed) may be used as a trigger.

Alternatively, the counting may be started after a predetermined time (for example, three seconds) after the last sheet of the image forming job has passed a predetermined position (for example, the fixing nip portion N).

In addition, for example, in anticipation that the mode will shift to the standby mode M2 when the image forming process on the last sheet of the image forming job is completed, the start of the image exposure may be used as a trigger, at which the time counting of the RTC830 is started.

In any case, the RTC 830 can perform a function of determining that the time during which the fixing process is not performed (the time during which the image forming operation is not performed) has continued for a predetermined time.

The state of the standby mode M2 is the first stage in which the copy machine A is in the standby state, and each image forming unit is in a state ready for the image forming operation, in which an image can be formed as soon as an image forming signal is inputted to the engine controller 802 (FIG. 13: S5 to S13). At this time, in the fixing device 40, the belt 100 and the pressure roller 101 are in the pressure contact state.

In the standby mode M2, when an image forming job is inputted from the external PC or the like (S5) or a copy operation instruction is inputted from the operating portion 700 (S6 to S13), the copying machine A shifts from the standby mode M2 to the image forming mode M1. If the operation shifts from the standby mode M2 to the image forming mode M1 at the time when the time counted by the RTC 830 is less than the set time (6 hours in this embodiment), the time counting of the RTC 830 is reset.

After a transition time from the state of the standby mode M2 to the low power mode M3 stored in the RAM (ENG) 812 elapses, the copying machine A transitions to the low power mode M3 (S7, S21). In this embodiment, the transition time set value (S7) to the low power mode M3 is set to 1 minute.

The state of the low-power mode M3 is the second stage of the copying machine A in the standby state, in which the standby power of the copying machine A is reduced as much as possible to save energy. For this reason, the engine controller 802 including the engine portion 600, the CPU (ENG) 810, and the image reading portion 601 are suspended, and the image forming operation is disabled.

The engine portion 600 and the operating portion 700 have a function of returning from the low power mode M3, and therefore, the functional portions other than the general function are at rest. The CPU (CNT) 820 of the main controller 801 is in the operating state restless operation state in which the CPU (CNT) 820 is operable to permit the return operation from the low power mode M3.

At this time, in the fixing device 40, the timer SW831 is set in the ON state, atf, the belt 100 and the pressure roller 101 maintain the pressure contact state. However, when the RTC 830 times out after a predetermined time has elapsed, the belt 100 and the pressure roller 101 are separated from each other (S14 to S18, S20). In this embodiment, the set time (S18) for outputting the pressure release instruction signal of the RTC 830 is set to 6 hours.

In this embodiment, the relationship is set such that [set value of transition time to low power mode M3 1 minute (S7)<predetermined time of RTC 830 of 6 hours (S18)]. Therefore, after the shift to the low power mode M3, the separating operation of the nip portion N is performed (S7 to S18, S20 to S21). That is, in the case where the timer SW button 831 is set to the ON state, the pressure release operation performed in the above-described predetermined time of 6 hours is performed after the shift to the low power mode M3.

In this embodiment, as described above, the relationship is "the transition time to the low power mode M3<the predetermined time of the RTC 830". However, the present invention is not limited to this example, and may be a set value of [the predetermined time of RTC 830 (S18)<the transition time to low power mode M3 (S7)].

When the timer SW 831 is set to OFF, the operation is not synchronized with the operation of the RTC 830, and therefore, a pressurization release instruction signal is outputted when the operation shifts to the low power mode M3 (S14, S20, S21). That is, at the time of transition to the low-power mode M3 (in conjunction with the transition), the pressure release operation is performed such that the pressurizing mechanism changes from the first position to the second position.

In this embodiment, the mode is shifted to the low power mode M3 in response to the elapse of the shift time to the low power mode M3 in the standby mode M2. However, the following structure may be used. That is, the structure may be such that the mode shifts to the low power mode M3 in response to the low power mode button 712 being pressed in the standby mode M2 state.

The structure may be such that when the timer SW 831 is set to OFF, the timer function of the RTC 830 may be stopped. When the timer SW 831 is set to OFF, the timer function by the RTC 830 may be operated, but the output of the pressure release instruction signal responsive to the output of the RTC 830 may not be performed (that is, the time count result may be ignored).

Next, a mechanism related to the operation of the copying machine A returning from the low power mode M3 will be described. In the state of the low-power mode M3, the function portions other than the condition for returning from the low-power mode M3 are in the rest state. Here, in order to return from the low power mode M3, a return operation is performed from a return condition function portion, and a return condition signal is outputted, so that the copying machine A shifts from the low power mode M3 to the standby mode M2 (FIG. 14: S22 to S23).

In this embodiment, the conditions for returning from the low power mode M3 are as follows.

When the low-power mode button 712 on the operating portion 700 is pressed (FIG. 14: S22) to shift the mode to the standby mode M2, each image forming unit is ready for the image forming operation such that an image can be formed as soon as an image forming signal is input to the engine controller 802.

At this time, in this embodiment, in the fixing device 40, the predetermined time setting of the RTC 830 is 6 hours. Therefore, when the timer SW 831 is set to ON, the belt 100 and the pressure roller 101 are in the pressure release state if 6 hours or more have elapsed since the timer start trigger of the RTC 830. If it is less than 6 hours, the belt 100 and the pressure roller 101 are in a contact state relative to each other. If the pressure is released, the pressure contact operation between the belt 100 and the pressure roller 101 is started in synchronization with the transition to the standby mode M2 so that the image can be formed (S14 to S18, S20).

When the timer SW 831 is set to OFF, the operation is not synchronized with the operation of the RTC 830, so that the belt 100 and the pressure roller 101 are in the pressure release state when shifting to the low power mode M3. Therefore, the pressing operation of the belt 100 and the pressure roller 101 is started in synchronization with the transition to the standby mode M2 (S14, S20, S21).

In order to perform the standby initial operation in the image forming preparation state after the pressing, the heater 102 is energized and the fixing motor 92 is rotated in the motor reversing direction Y which is the CW direction, and the belt 100 and the pressure roller 101 are rotated to be preheated. If an image forming instruction is received during the transition to the preheating state, the mode is switched from the standby mode M2 to the image forming mode M1 to perform an image forming operation (S5 to S13).

As described above, the setting enable/disable switch SW831 for enabling/disabling the operation of the time difference device such as the timer in the operation sequence in which the pressure releasing operation of the fixing device 40 is performed using the time difference device such as the timer or the like while the copying machine A is at rest in the low power mode or the like, so that the user can make the selection.

In such an image forming apparatus, by setting the timer SW831 to OFF, it is possible to meet the user's request for suppressing sudden sound generation. Also, by setting the timer SW 831 to ON, the number of times of the pressurizing operation and the pressure releasing operation of the pressurizing mechanism is reduced, so that it is possible to meet a user's demand for preventing deterioration of the pressurizing member.

Therefore, it is possible to provide an image forming apparatus having a fixing device capable of achieving convenience of the user freely selecting suppression of sudden sound generation and reduction of the number of operations.

Embodiment 2

A second embodiment will be described, in which members having the same functions as in the first embodiment are assigned the same reference numerals, and description thereof will be omitted.

In this embodiment, the transition time set value to the standby mode M2 is set to 15 seconds (FIG. 12: S4). Further, the set value of the transition time to the low power mode M3 (FIG. 13: S7) is set to 6 hours. Further, the set time (S18) for outputting the pressure release command signal of the RTC 830 was set to 4 hours.

In this embodiment, the relationship is [the predetermined time of 4 hours of RTC 830 (S18)<the set value of transition time to the low power mode M3 6 hours (S7)]. Therefore, the transition to the low power mode M3 is performed after the separation operation of the nip N (S14 to S21). That is, after performing the pressure release operation performed for a predetermined time period of 4 hours, a transition to the low power mode M3 is performed.

In this embodiment, as described above, the relationship of [the predetermined time of RTC 830<the time of transition to low power mode M3] is not limited to this example, and [the time of transition to low power mode M3 (S7)<the predetermined time (S18) of the RTC 830].

When the timer SW 831 is set to OFF, since the operation is not synchronized with the operation of the RTC 830, a pressurization release command signal is output when shifting to the low power mode M3 (S14, S20, S21).

Embodiment 3

Embodiment 3 will be described. Members having the same functions as in the first embodiment are assigned the same reference numerals, and description thereof will be omitted. In this embodiment, the transition time set value to the standby mode M2 is set to 15 seconds (FIG. 12: S4). Further, the set value of the transition time to the low power mode M3 (S FIG. 13: S7) is set to 1 minute.

In the first and second embodiments, when the timer SW 831 is set to OFF, the operation is not synchronized with the operation of the RTC 830, and therefore, the pressurization release command signal is outputted when the mode shifts to the low power mode M3 (S14, S20, S21).

In this embodiment, when the timer SW 831 is set to OFF, non-separation is selected (S14, S19, S21). That is, in this embodiment, when shifting to the low power mode M3, the contact state is maintained without performing separation.

When the timer SW 831 is set to ON, the operation is the same as in the first and second embodiments.

<<Others>>

(1) In each of the above embodiments, the fixing device 40 uses the endless rotatable member that is not stretched, on the heating member (heater) side, and the roller on the pressing side, but the present invention is not limited to this fixing method. For example, an endless rotatable member may be used on the pressure roller side, or a fixing type of a stretched endless rotatable member method may be used on the heating member side.

(2) In each embodiment, as shown in FIG. 6, the pressure is released so that the belt 100 and the pressure roller 101 are separated from each other, but the present invention is not limited to such an example. If the pressure is such that no pressure contact mark is formed on the belt 100 or the pressure roller 101, the low pressure contact (in other words, the state in which the load applied to the nip portion is smaller than the pressure state) may be the pressure release state.

(3) In each embodiment, the pressing-mechanism/pressure-releasing-mechanism is configured to perform the pressing operation/pressure releasing operation by moving the belt 100 side, but it will suffice if at least one of the belt 100 and the pressure roller 101 is moved. For example, the pressing-mechanism/pressure-release-mechanism may be structured to perform a pressure operation/pressure release operation by moving the pressure roller 101 side.

(4) The fixing device 40 has been described as an example of a device which heats and fixes an unfixed toner image formed on a sheet, but the present invention is not limited such an example. For example, the present invention may be used with a device for increasing the gloss (glossiness) of an image by heating and re-fixing a toner image which has been temporarily fixed to a sheet (also in this case, also referred to as a fixing device).

(5) The heating means for heating the rotatable member is not limited to the ceramic heater of the embodiments. An internal heating type or an external heating type device using a heater such as an electromagnetic induction heating means, a halogen heater, an infrared lamp, or a nichrome wire heater can also be used.

(6) The image forming apparatus is not limited to the electrophotographic full-color image apparatus of the embodiment, and may be an image forming apparatus which forms a monochrome image. Further, the invention is not limited to the electrophotographic system, and may be an image forming apparatus which forms a toner image using another process such as an electrostatic recording system or a magnetic recording system.

(7) The image forming apparatus is not limited to a copy machine. A printer without the image reading portion 601 or the ADF 611 may be used.

(8) In each embodiment, the structure has been described in which the setting of the timer ON or the timer OFF for enabling or disabling the timer function can be performed on the touch panel 702 of the operating portion 700 provided in the copy machine A. However, a structure in which the timer ON or the timer OFF for enabling/disabling the timer function may be set by an external PC may be adopted.

Here, the external PC is a device such as a personal computer connected to the copy machine A through a network (for example, a LAN cable or a wireless LAN). For example, by installing a predetermined driver capable of setting the timer function of the copying machine A on the external PC, the operator can set the timer ON or OFF to determine whether or not the timer function can be operated on the display of the external PC. The information set on the display of the external PC is transmitted to the controlling portion 800 of the copy machine A via the network. The controlling portion 800 may be structured to execute the control of each of the above-described embodiments according to the received settings.

(9) Furthermore, in each embodiment, the condition for returning from the low power mode M3 is that the low power mode button 712 is pressed, but a structure may be adopted in which the returning operation is executed from the low power mode M3 by another trigger. For example, a structure may be employed in which an image forming job from the external PC can be received in the low power mode M3, and the return from the low power mode is triggered by receiving an image forming job from the external PC. In addition, for example, the copy machine A may be provided with a motion sensor for detecting the presence of a person around the copy machine A, and the operation may return from the low power mode M3 in response to the detection of the person by the motion sensor. Moreover, for example, the fact that a predetermined operation related to the image forming operation (input of a copy start instruction or the like) is performed on the operating portion 700 may be used as the return trigger from the low power mode M3.

INDUSTRIAL APPLICABILITY

According to the present invention, by responding to a user's desire to prioritize reduction of the number of unnecessary pressure release operations in the fixing device and a user's desire to prioritize suppression of operation sound of sudden operation in the fixing device, thus the image forming apparatus with improved user convenience is provided.

The invention claimed is:

1. An image forming apparatus for forming an image, said apparatus comprising:
an image forming portion for forming an image on a sheet;
a first rotatable member;
a second rotatable member cooperative with said first rotatable member to form a nip for fixing the image formed by said image forming portion, on the sheet;
a pressing mechanism for pressing said first rotatable member toward said second rotatable member;
a moving mechanism for moving said pressing mechanism between a first position in which said nip is formed by said first rotatable member and said second rotatable member, and a second position in which said first rotatable member and said second rotatable member are spaced from each other;
a controller for controlling an operation of said moving mechanism; and
a manual operating portion,
wherein said image forming apparatus is capable of shifting to a low electric power mode in which said controller is at rest after elapse of a first predetermined time after completion of execution of the image formation job,
wherein said image forming apparatus is capable of executing an operation in a plurality of control modes including at least first and second control modes, wherein in the first control mode a pressure releasing operation is executed such that said pressing mechanism is shifted from the first position to the second position after elapse of a second predetermined time longer than the first predetermined time after completion of execution of the image formation job, and wherein in the second control mode a pressure releasing operation is executed such that said pressing mechanism is shifted from the first position to the second position at the time of shifting to the low electric power mode, and
wherein said manual operating portion is capable of selecting one of the control modes to execute the operation.

2. An image forming apparatus for forming an image, said apparatus comprising:
an image forming portion for forming an image on a sheet;
a first rotatable member;
a second rotatable member cooperative with said first rotatable member to form a nip for fixing the image formed by said image forming portion, and the sheet;
a pressing mechanism for pressing said first rotatable member toward said second rotatable member;
a moving mechanism for moving said pressing mechanism between a first position in which said nip is formed by said first rotatable member and said second rotatable member, and a second position in which a force applied between said first rotatable member and said second rotatable member by said pressing mechanism is smaller than that applied in the first position;
a controller for controlling an operation of said moving mechanism; and
a manual operating portion,
wherein said image forming apparatus is capable of shifting to a low electric power mode in which said controller is at rest after elapse of a first predetermined time after completion of execution of the image formation job,
wherein said image forming apparatus is capable of executing an operation in a plurality of control modes including at least first and second control modes, wherein in the first control mode a pressure releasing operation is executed such that said pressing mechanism is shifted from the first position to the second position after elapse of a second predetermined time longer than the first predetermined time after completion of execution of the image formation job, and wherein in the second control mode a pressure releasing operation is executed such that said pressing mechanism is shifted from the first position to the second position at the time of shifting to the low electric power mode, and
wherein said manual operating portion is capable of selecting one of the control modes to execute the operation.

* * * * *